United States Patent [19]

Geiger

[11] Patent Number: 5,035,255
[45] Date of Patent: Jul. 30, 1991

[54] DEVICE FOR CHANGING THE PRESSURE IN A TIRE OF A MOTOR VEHICLE

[75] Inventor: Hartmut Geiger, Garbsen, Fed. Rep. of Germany

[73] Assignee: Wabco Westinghouse Fahrzeugbremsen GmbH, Hannover, Fed. Rep. of Germany

[21] Appl. No.: 495,323

[22] Filed: Mar. 19, 1990

[30] Foreign Application Priority Data

Mar. 17, 1989 [DE] Fed. Rep. of Germany ....... 3908807

[51] Int. Cl.⁵ .............................................. F16K 11/10
[52] U.S. Cl. ....................................... 137/102; 137/116
[58] Field of Search .......................... 137/102, 116, 115

[56] References Cited

U.S. PATENT DOCUMENTS

| 2,718,897 | 9/1955 | Andrews | 137/102 |
| 3,196,890 | 7/1965 | Brandenberg | 137/102 |
| 3,599,657 | 8/1971 | Maldavs | 137/102 |

FOREIGN PATENT DOCUMENTS

| 297837 | 1/1989 | European Pat. Off. . |
| 3332677 | 3/1985 | Fed. Rep. of Germany . |
| 3636240 | 4/1988 | Fed. Rep. of Germany . |
| 1424562 | 12/1965 | France . |

Primary Examiner—Alan Cohan
Attorney, Agent, or Firm—Horst M. Kasper

[57] ABSTRACT

A device for changing the pressure in tires of a motor vehicle. The novel device achieves that the venting of the tires can be performed independent of throttling. The device includes a tire-pressure control valve (1) with a pneumatic connection terminal (8). A control element (10) is chargeable via the pneumatic connection terminal (8). The control element (10) is formed as an actuating piston, for actuation of the valve device, comprised of valve seat (5) and closure body (6), against a restoring force, furnished by a valve spring (7), into the open position by the pressure of the compressed-air source. The device can be retrofitted into the conventional tire-pressure control device systems.

12 Claims, 2 Drawing Sheets

DEVICE FOR CHANGING THE PRESSURE IN A TIRE OF A MOTOR VEHICLE

BACKGROUND OF THE INVENTION

1. Field of the Invention

The invention relates to a device for changing the pressure in a tire of a motor vehicle, where the tire of the motor vehicle is connectable to a compressed-air source.

2. Brief Description of the Background of the Invention Including Prior Art

Such a device for changing the pressure of a tire is employed in order to adapt the pressure of the tire of a motor vehicle to changing soil, ground, and terrain conditions such that, for example, in case of a soft terrain, an increased tread contact surface of the tire is achieved with a low tire pressure while, in case of a surfaced road, an undesirable, high flexing of the tire and thus a premature wear of the tire is avoided with a higher tire pressure.

A device of this kind has become known through the German Patent Application Laid Open DE-OS 3,332,677.

The device of the German Patent Application Laid Open DE-OS 3,332,677 exhibits a tire-pressure control valve. The compressed-air system of the motor vehicle is connectable to the tire via the tire-pressure control valve for filling of the tire. The discharge of the tire also occurs via the tire-pressure control valve. In this operation, the air can be guided from the tire through the tire-pressure control valve in a direction opposite to the filling process. In order to achieve an accelerated discharge of air from the tire or, respectively, a shortening of the discharge time, there is disposed between the tire-pressure control valve and the compressed-air system of the motor vehicle a vent valve with an exhaust into the atmosphere. In case of charging the vent valve with a pressure corresponding to the tire pressure, the vent valve opens up toward the atmosphere such that air flows from the tire into the atmosphere via the vent valve.

Corresponding to the structural character of the tire-pressure control valve, each tire-pressure change process is terminated by suddenly removing air from the tire-pressure control valve to the side of the compressed-air system of the motor vehicle, for example, via a relay valve. Based on this, the tire-pressure control valve closes, whereby the connection from the tire to the side of the compressed-air system of the motor vehicle is blocked by the tire-pressure control valve.

However, the described closure process of the tire-pressure control valve is performed with sufficient certainty only in cases where the air present in the tire and subjected to tire pressure is prevented, during the sudden venting of the tire-pressure control valve, from flowing too quickly into the vented tire-pressure control valve, such that the tire-pressure control valve does not pass into the desired closure position.

The described closure process is achieved in the initially recited apparatus by a relative throttling of the air stream from the tire to the tire-pressure control valve, usual in such apparatus. In this context, only the ratio of the effective passage cross-section in front of and behind the tire-pressure control valve is essentially important. This means that, because of the vent valve described in the conventional device, the throttle cross-section, nevertheless still required between tire and tire-pressure control valve, can be made somewhat larger. Because this throttling is still required for the above-cited device, the basic disadvantage, resulting in relatively long times for the discharging of compressed air from the tire and for the emptying of the tire, still have to be accepted.

SUMMARY OF THE INVENTION

1. Purposes of the Invention

It is an object of the invention to improve a device of the recited kind such that safe modes of operation of the device are assured independent of the above-recited ratio of the effective passage cross-sections.

It is a further object of the present invention to allow a simplified control of the discharge process of a motor vehicle tire.

It is yet a further object of the present invention to allow a precise and quick control of the tire pressure to be established in a motor vehicle tire.

These and other objects and advantages of the present invention will become evident from the description which follows.

2. Brief Description of the Invention

The present invention provides for a device for changing the pressure in tires of a motor vehicle. The level of the discharge pressure of the compressed-air source can be adjusted. A vent valve has a first connection and a second connection. The vent valve is adjustable pressure-dependent and is constructed such that the second connection of the vent valve is connectable to the first connection, connected to a compressed-air source, in a first position of the vent valve. The second connection of the vent valve is connectable to a third connection, connected to the atmosphere, in a second position of the vent valve. The vent valve is structured such that the vent valve is chargeable, on the one hand, by the pressure in the first connection in the direction to the first position and, on the other hand, by the pressure in the second connection in the direction to the second position. A tire-pressure control valve is disposed in a compressed-air line serving for filling and discharging air of a tire. The tire pressure-control valve has a first connection, a second connection and a third connection terminal. The first connection of the tire-pressure control valve is connected to a tire air-filling connection. The second connection terminal of the tire-pressure control valve is connected to the second connection of a vent valve. The third connection terminal of the tire-pressure control valve charges a control element, formed as an actuating piston, with a pressure of the compressed-air source for actuating and maintaining open a valve device, comprised of a valve seat and a closure body, against a restoring force furnished by a valve spring. A valve device is incorporated in the tire-pressure control valve. Two connections of the tire-pressure control valve are connectable to each other via the operation of the valve device.

The third connection terminal of the tire-pressure control valve can be connected to the first connection of the vent valve.

The tire-pressure control valve can comprise a control chamber. The control element can be formed as a movable wall of the control chamber of the tire-pressure control valve and can act as an actuating piston. The control element can be disposed longitudinally movable relative to the valve. An extension of the valve can be formed as a valve tappet. The extension can be movable with the closure body of the valve into an open position.

One side of the control element, disposed remote relative to the third connection terminal of the tire-pressure control valve, can be sealed versus the first connection terminal and the second connection terminal of the tire-pressure control valve.

The tire-pressure control valve and the vent valve can be structurally joined to a single valve unit in a joint casing.

The invention is associated with the advantage that the line running from the tire via the vent valve can be formed with a cross-section as large as desired without interfering with the above-recited closing of the tire-pressure control valve after a tire-pressure change process. The emptying of the tires can thereby be performed with a higher discharge speed for the compressed air than this would be possible in case of the initially recited device.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
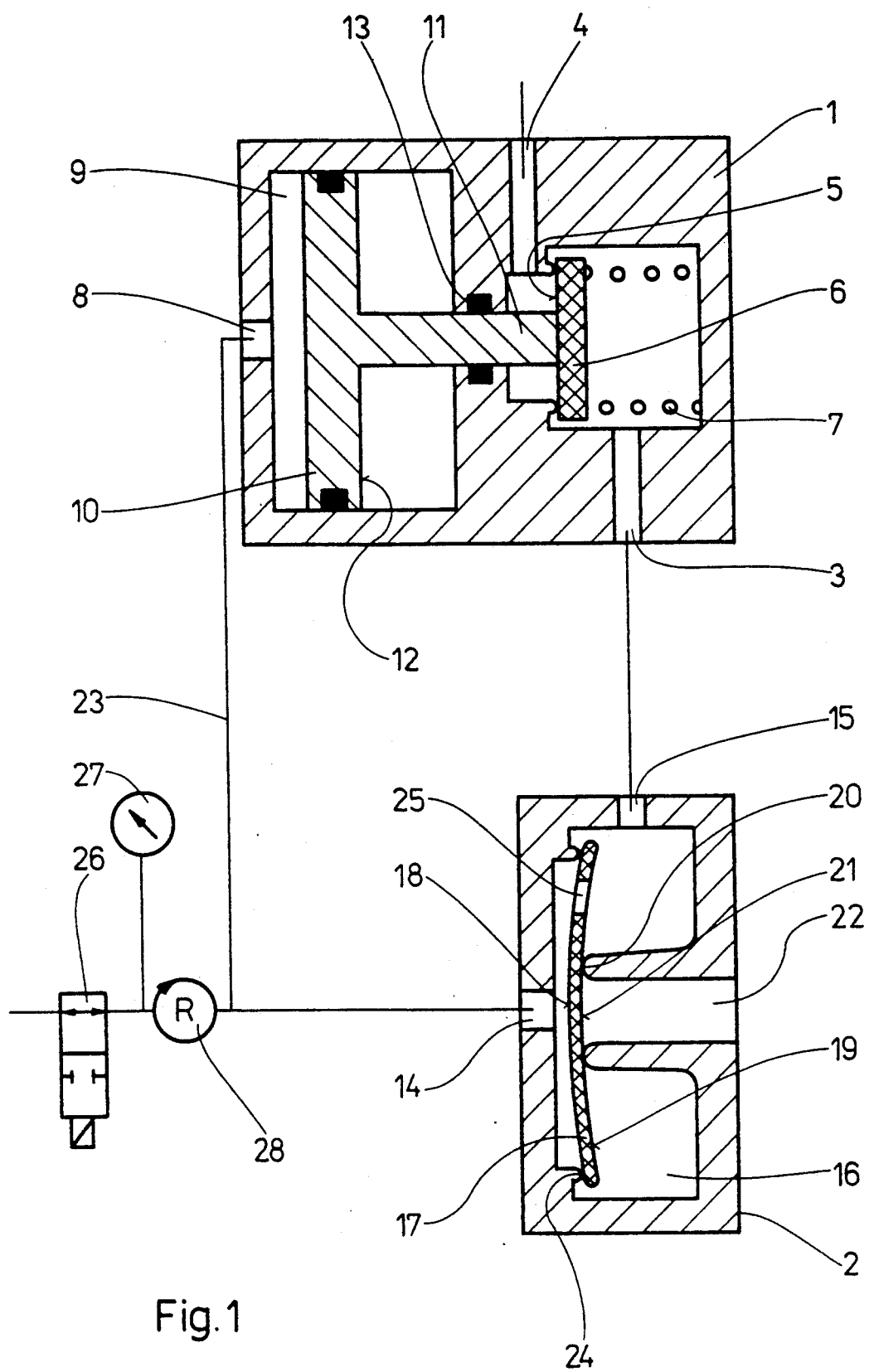
FIG. 1 shows a schematic diagram illustrating a valve combination controllable, on the one hand, by the pressure of the compressed-air system of the motor vehicle and, on the other hand, by the tire pressure.
Figure 2:
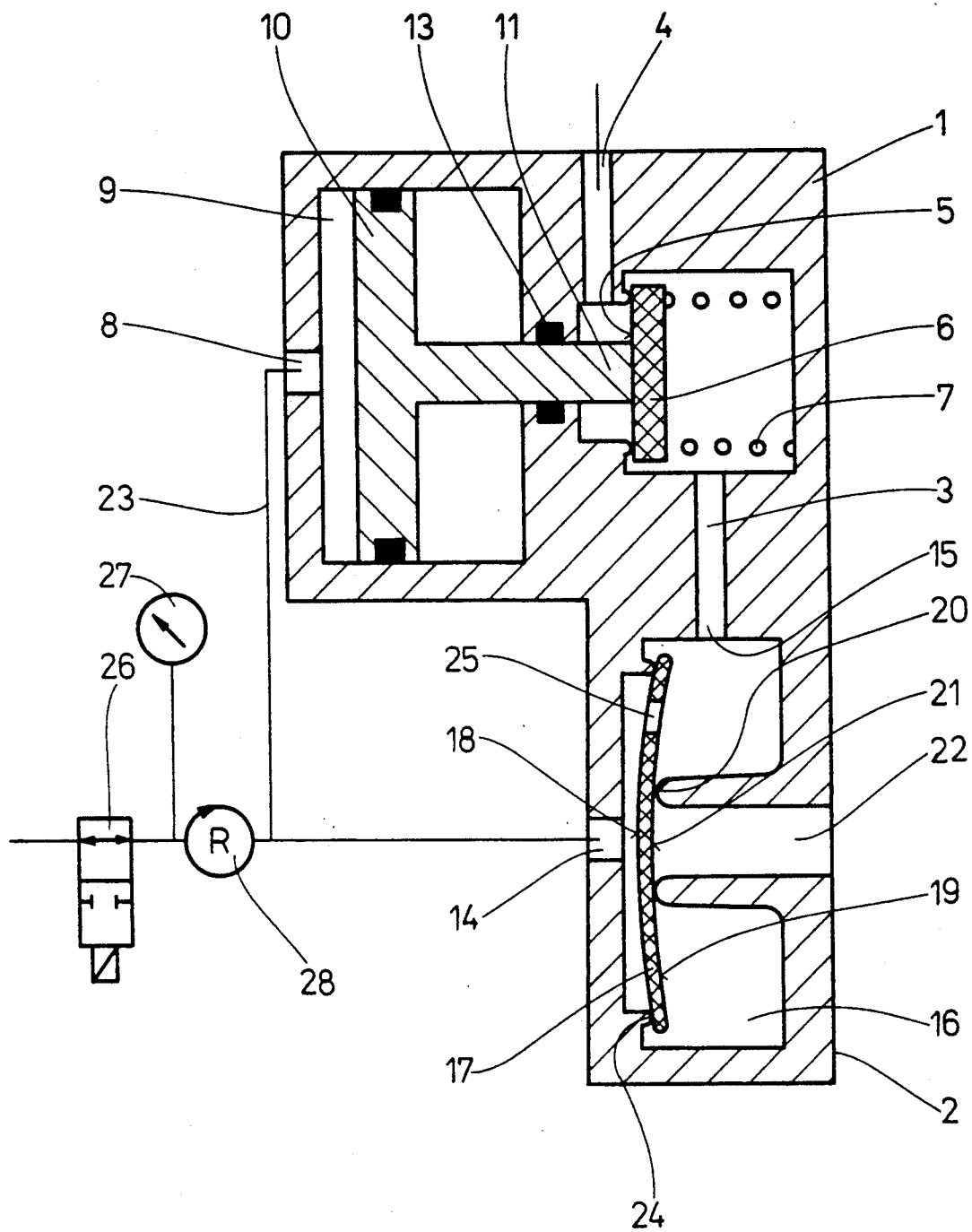
FIG. 2 shows an alternate embodiment which is identical to the FIG. 1 embodiment except for the control valve and vent valve being joined at a single valve unit in a joint casing.

According to the present invention, there is provided a device for changing the pressure in tires of a motor vehicle. A tire-pressure control valve is disposed in a compressed-air line serving for filling and discharging air from a tire. A first connection of the tire-pressure control valve is connected to a tire connection. A second connection of the tire-pressure control valve is connected to a second connection of a vent valve. A valve device is furnished at the tire-pressure control valve, where two connections of the tire-pressure control valve are connectable to each other via the valve device. The vent valve is adjustable pressure-dependent and is constructed such that a second connection of the vent valve is connectable with a first connection, connected to a compressed-air source, in a first position of the vent valve. A second connection of the vent valve is connectable to a third connection, connected to the atmosphere, in a second position of the vent valve. The vent valve is structured such that the vent valve is chargeable, on the one hand, by the pressure in the first connection in the direction to the first position and, on the other hand, by the pressure in the second connection in the direction to the second position. The level of the discharge pressure of the compressed-air source can be adjusted. The tire-pressure control valve 1 exhibits a third connection terminal 8. A control element 10, formed as an actuating piston, is charged via the third connection terminal 8 with a pressure of the compressed-air source for actuating and maintaining open a valve device against a restoring force. The valve device is comprised of a valve seat 5 and a closure body 6. The restoring force is furnished by a valve spring 7.

The third connection terminal 8 of the tire-pressure control valve 1 can be connected to the first connection 14 of the vent valve 2.

The control element 10 can be formed as a movable wall of a control chamber 9 of the tire-pressure control valve 1. The control element 10 can be disposed longitudinally movable relative to the valve, comprised of valve seat 5 and closure body 6, and can exhibit an extension 11 formed as a valve tappet. The extension 11 can be movable with the closure body 6 of the valve into an open position.

A side 12 of the control element 10, disposed remote relative to the third connection terminal 8 of the tire-pressure control valve 1, can be sealed versus the second connection terminal 3 and the first connection terminal 4 of the tire-pressure control valve I.

The tire-pressure control valve 1 and the vent valve 2 can be structurally joined to a single valve unit in a joint casing.

The figures illustrate a valve combination which is controllable, on the one hand, by the pressure of the compressed-air system of the motor vehicle and, on the other hand, by the tire pressure. The valve combination is comprised of a tire-pressure control valve 1 and a vent valve 2.

The apparatus is provided for controlling air-pressure changes in tires of a vehicle which are either initiated by the driver or by an automatic process.

The valve combination, comprised of tire-pressure control valve 1 and vent valve 2, of the apparatus for changing the pressure in tires of a motor vehicle is attached at the vehicle wheel and is connected via lines to the compressed-air system of the vehicle and to the interior of one of the tires of the vehicle wheel to be controlled.

The valve combination, comprised of tire-pressure control valve 1 and vent valve 2, which rotates with the motor vehicle wheel, is connected to the compressed-air system. The compressed-air system is fixedly installed at the vehicle by way of a rotation movable seal 28, which is called rotor.

The tire-pressure control valve 1 exhibits a second connection terminal 3 which is chargeable with a pressure corresponding to pressure of the compressed-air system of the vehicle. A first connection terminal 4 of the tire-pressure control valve 1 is chargeable with a pressure corresponding to the tire pressure. The second connection terminal 3 and the first connection terminal 4 of the tire-pressure control valve 1 are connected to each other via a valve, in the open position of the valve. The valve is formed by a case-fixed valve seat 5 and a closure body 6. The closure body 6 is loaded in the closure direction by a valve spring 7.

The tire-pressure control valve 1 exhibits a third connection terminal 8, serving as a pneumatic control input. The third connection terminal 8 opens into a control chamber 9 of the tire-pressure control valve 1 and can be charged with a pressure corresponding to the pressure of the compressed-air system of the motor vehicle. A pneumatically actuatable control element 10 is disposed in the control chamber 9. The valve, comprised of valve seat 5 and closure body 6, connecting the second connection terminal 3 to the second connection terminal 4, is movable into the open position with the control element 10.

The control element 10 is formed as a movable wall of the control chamber 9, in the kind of an actuating piston or of a membrane. The control element 10 is disposed movable in longitudinal direction relative to the valve, formed by valve seat 5 and closure body 6, and exhibits an extension 11, formed as a valve tappet. The closure body 6 can be moved into the open position with the extension 11.

The side 12 of the control element 10, disposed away from the third connection terminal 8 of the tire-pressure control valve 1, is sealed by a seal 13 versus the first connection terminal 3 and the second connection terminal 4 of the tire-pressure control valve 1.

The vent valve 2 includes a first connection 14, which can be charged with a pressure corresponding to the pressure of the compressed-air system of the vehicle.

The vent valve 2 is includes a second connection 15, which can be charged with a pressure corresponding to the tire pressure. The second connection 15 of the vent valve 2 is connected to the second connection terminal 3 of the tire-pressure control valve 1.

The second connection 15 of the vent valve 2 is connected to a chamber 16, where the closure of the chamber 16 is formed, relative to the first connection 14, by a closure body, in the shape of a membrane 17.

The membrane 17 exhibits an effective surface 18, chargeable from the first connection 14, and an annular effective surface 19, chargeable from the second connection 15, The annular effective surface 19 surrounds a case-fixed valve seat 20, as well as an effective surface 21. The effective surface 21 is delimited by the valve seat 20.

In the region of its outer diameter, the membrane 17 forms an input valve together with a case-fixed valve seat 24. Air from the first connection 14 can flow to the second connection 15 of the vent valve 2 through the input valve, comprised of membrane 17 and valve seat 24.

The first connection 14 of the vent valve 2 is connected by a line 23 to the third connection terminal 8 of the tire-pressure control valve 1.

The mode of operation of the device is as follows:

1. Increase of Tire Pressure

Air is fed with a predetermined pressure from the compressed-air system of the motor vehicle to the first connection 14 of the vent valve 2 and to the third connection terminal 8 of the tire-pressure control valve 1.

The output port 22 of the vent valve 2, discharging into the atmosphere, is blocked versus the first connection 14 and the second connection 15 of the vent valve 2. This is achieved by charging the effective surface 18 of the membrane 17 with compressed air and the thereby induced closing of the discharge valve, comprised of membrane 17 and valve seat 20. In the region of its outer diameter, the membrane 17 lifts off the valve seat 24, based on simultaneous charging of the part of the effective surface 18 of the membrane 17 protruding over the valve seat 20. Thereby, the input valve, comprised of membrane 17 and valve seat 24, assumes an open position and the air can flow over the second connection 15 of the vent valve 2 to the second connection terminal 3 of the tire-pressure control valve 1.

By a simultaneous charging of the third connection terminal 8 of the tire-pressure control valve 1 with air, the control element 10 is actuated such that the extension 11, formed as a valve tappet, moves the valve, comprised of valve seat 5 and closure body 6, into the open position.

The air can now pass from the compressed-air system of the motor vehicle via the input valve, comprised of membrane 17 and valve seat 24, of the vent valve 2 and via the valve, comprised of valve seat 5 and closure body 6, as well as via the connection terminal 4 of the tire-pressure control valve 1 into the tire.

2. Termination of the Tire Pressure Change Process

After venting has been completed, i.e. when the tire pressure has reached the desired level, the driver or an automatic device of the compressed-air system of the motor vehicle withdraws suddenly the pressure from the third connection terminal 8 of the tire-pressure control valve 1 and from the first connection 14 of the vent valve 2. Thereby, the control element 10 becomes pressureless such that the valve, comprised of valve seat 5 and closure body 6, is closed based on the force of the valve spring 7 acting on the closure body 6. Simultaneously, the valve, comprised of membrane 17 and valve seat 24, closes in the vent valve 2.

The valve spring 7 and the faces of the valve seat 5 and of the control element 10 are coordinated such to each other that, on the one hand, in case of a permissible maximum tire pressure, the valve, comprised of valve seat 5 and closure body 6, cannot be opened by the tire pressure and, on the other hand, the valve, comprised of valve seat 5 and closure body 6, closes automatically if a predetermined minimum pre-control pressure is reached and undercut in the control chamber 9.

The pressure still remaining between the tire-pressure control valve 1 and the vent valve 2 is discharged, based on the venting of the first connection 14 of the vent valve 2, via the discharge valve, comprised of membrane 17 and valve seat 20, and the output port 22 into the atmosphere.

Both an increasing as well as a decreasing of the tire pressure is terminated with this process, which always follows a sudden venting at the third connection terminal 8 of the tire-pressure control valve 1 and at the first connection 14 of the vent valve 2.

A separation of the control pressure from the filling pressure or, respectively, the discharge pressure of the tire is achieved by the invention structure of the tire-pressure control valve 1 as a directionally pre-controllable 2/2-way valve. The connection from the interior of the tire to the first connection terminal 4 of the tire-pressure control valve 1 can be formed by an unthrottled line of an arbitrary cross-section. This achieves an optimum filling time or, respectively, discharge time for the tire.

3. Lowering of Tire Pressure

Air with a preset pressure, which pressure is lower than the tire pressure, is fed via a pressure control valve to the first connection 14 of the vent valve 2 and to the third connection terminal 8 of the tire-pressure control valve 1 from the compressed-air system of the motor vehicle. By charging of the control elements 10, the valve, comprised of valve seat 5 and closure body 6, of the tire-pressure control valve 1 is moved into the open position.

Now the air can pass from the tire via the first connection terminal 4, via the valve, comprised of valve seat 5 and closure body 6, via the second connection terminal 3 of the tire-pressure control valve 1 to the second connection 15 and into the chamber 16 of the vent valve 2. By charging of the annular effective surface 19 of the membrane 17, the membrane 17 lifts off from the valve seat 20 such that air can now flow via the precited connection from the tire via the output port 22 into the atmosphere. It is necessary to maintain a pressure at the connection terminal 8 during the lowering of the tire pressure by way of suitable steps, such as, for example, by employing a pressure-limiting valve in the feed line to the rotor 28. In this case, the pressure has to be at least sufficiently high such that a setting back of the valve closure body 6 onto the valve seat 5 is prevented by the force of the valve spring 7.

If the first connection 14 and the second connection 15 of the vent valve 2 are connected to each other via a throttle 25, a testing of the respectively reached tire pressure can be performed during a tire-pressure change process. For this purpose, the valve combination, comprised of tire-pressure control valve 1 and vent valve 2, is blocked by a switchable blocking valve 26 versus the compressed-air system of the motor vehicle. A pressure balance occurs now via the valve, comprised of valve seat 5 and closure body 6, of the tire-pressure control valve 1, where said valve is open during a tire-pressure change process, and via the throttle 25 of the vent valve 2 such that the respectively present tire pressure is found in the line from the first connection 14 of the vent valve 2 to the blocking valve 26. The above-recited tire pressure can be made visible with the aid of a measurement device 27 disposed in the line between the first connection 14 of the vent valve 2 and the blocking valve 26.

If the testing of the tire pressure is performed after an interruption of the tire-pressure lowering, then the above-recited pressure balancing bring about, via the throttle 25, a closing of the discharge valve, comprised of membrane 17 and valve seat 20, relative to the atmosphere.

It will be understood that each of the elements described above, or two or more together, may also find a useful application in other types of pressure change devices differing from the types described above.

While the invention has been illustrated and described as embodied in the context of a device for changing the pressure in a tire of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A device for changing the pressure in tires of a motor vehicle, comprising
    a compressed-air source, wherein the level of the discharge pressure of the compressed-air source can be adjusted;
    a vent valve having a first connection and a second connection, wherein the vent valve is adjustable pressure-dependent and is constructed such that the second connection of the vent valve is connectable to the first connection, connected to a compressed-air source, in a first position of the vent valve, and wherein the second connection of the vent valve is connectable to a third connection, connected to the atmosphere, in a second position of the vent valve, and wherein the vent valve is structed such that the vent valve is chargeable, on the one hand, by the pressure in the first connection in the direction to the first position and, on the other hand, by the pressure in the second connection in the direction to the second position;
    a tire-pressure control valve disposed in a compressed-air line serving for filling and discharging air of a tire and having a first connection, a second connection and a third connection terminal, wherein the first connection of the tire-pressure control valve is connected to a tire air-filling connection, wherein the second connection terminal of the tire-pressure control valve is connected to the second connection of a vent valve, and wherein the third connection terminal of the tire-pressure control valve charges a control element, first as an actuating piston, with a pressure of the compressed-air source for actuating and maintaining open a valve device, comprised of a valve seat and a closure body, against a restoring force furnished by a valve spring;
    a valve device incorporated in the tire-pressure control valve, where two connections of the tire-pressure control valve are connectable to each other via the operation of the valve device.

2. The device according to claim 1, wherein the third connection terminal of the tire-pressure control valve is connected to the first connection of the vent valve.

3. The device according to claim 1, wherein the tire-pressure control valve comprises a control chamber, and wherein the control element is formed as movable wall of the control chamber of the tire-pressure control valve and acts as an actuating piston.

4. The device according to claim 1, wherein the control element is disposed longitudinally movable relative to the valve, and further comprising an extension of the valve, formed as a valve tappet, where the extension is movable with the closure body of the valve into an open position.

5. The device according to claim 1, wherein one side of the control element, disposed remote relative to the third connection terminal of the tire-pressure control valve, is sealed versus the first connection terminal and the second connection terminal of the tire-pressure control valve.

6. The device according to claim 1, wherein the tire-pressure control valve and the vent valve are joined by construction to a single valve unit in a joint casing.

7. A device for changing the pressure in tires of a motor vehicle, comprising
    a tire-pressure control valve disposed in a compressed-air line serving for filling and discharging air from a tire, where a first connections of the tire-pressure control valve is connected to a wire connection;
    a second connection of the tire-pressure control valve is connected to a second connection of a vent valve;
    a valve device is furnished at the tire-pressure control valve, where two connections of the tire-pressure control valve are connectable to each other via the valve device;

wherein the vent valve is adjustable pressure-dependent and is constructed such that a second connection of the vent valve is connectable with a first connection, connected to a compressed-air source, in a first position of the vent valve, and wherein a second connection of the vent valve is connectable to a third connection, connected to the atmosphere, in a second position of the vent valve, wherein the vent valve is structured such that the vent valve is chargeable, on the one hand, by the pressure in the first connection in the direction to the first position and, on the other hand, by the pressure in the second connection in the direction to the second position;

wherein the level of the discharge pressure of the compressed-air source can be adjusted;

wherein the tire-pressure control valve (1) exhibits a third connection terminal (8), where a control element (10), formed as an actuating piston, is charged via the third connection terminal (8) with a pressure of the compressed-air source for actuating the maintaining open a valve device, comprised of a valve seat (5) and a closure body (6), against a restoring force, furnished by a valve spring (7).

8. The device according to claim 7, wherein the third connection terminal (8) of the tire-pressure control valve (1) is connected to the first connection (14) of the vent valve (2).

9. The device according to claim 1, wherein the control element (10) is formed as a movable wall of a control chamber (9) of the tire-pressure control valve (1).

10. The device according to claim 1, wherein the control element (10) is disposed longitudinally movable relative to the valve, comprised of valve seat (5) and closure body (6), and exhibits an extension (11) formed as a valve tappet, where the extension (11) is movable with the closure body (6) of the valve into an open position.

11. The device according to claim 1, wherein a side (12) of the control element (10), disposed remote relative to the third connection terminal (8) of the tire-pressure control valve (1), is sealed versus the first connection terminal (3) and the second connection terminal (4) of the tire-pressure control valve (1).

12. The device according to claim 1, wherein the tire-pressure control valve (1) and the vent valve (2) are structurally joined to a single valve unit in a joint casing.

* * * * *